(12) United States Patent
Hsu

(10) Patent No.: US 6,819,362 B2
(45) Date of Patent: Nov. 16, 2004

(54) DISPOSITION DEVICE FOR AUTO-DETECTING THE HOLDING CONDITION OF A DIGITAL CAMERA

(75) Inventor: Ying-Hao Hsu, Kaohsiung (TW)

(73) Assignee: Benq Corporation, Taoyuan (TW)

( * ) Notice: Subject to any disclaimer, the term of this patent is extended or adjusted under 35 U.S.C. 154(b) by 813 days.

(21) Appl. No.: 09/790,767

(22) Filed: Feb. 21, 2001

(65) Prior Publication Data

US 2002/0036703 A1 Mar. 28, 2002

(30) Foreign Application Priority Data

Sep. 25, 2000 (TW) .......... 89119732 A

(51) Int. Cl.[7] .......... H04N 5/225; H04N 5/228; H04N 5/222; G03B 17/00; G09G 5/00; G06F 15/00

(52) U.S. Cl. .......... 348/374; 348/208.16; 348/333.01; 396/50; 345/659; 702/150

(58) Field of Search .......... 348/208.6, 208.16, 348/333.01, 333.06, 333.07, 333.11, 333.12, 373, 374, 375, 376; 382/297; 396/50; 702/150, 151; 250/559.37; 345/659; 340/689

(56) References Cited

U.S. PATENT DOCUMENTS

| | | | | |
|---|---|---|---|---|
| 4,364,650 A | * | 12/1982 | Terashita et al. | .......... 396/234 |
| 5,122,827 A | * | 6/1992 | Saegusa et al. | .......... 348/375 |
| 5,144,358 A | * | 9/1992 | Tsuru et al. | .......... 396/50 |
| 5,710,947 A | * | 1/1998 | Teremy et al. | .......... 396/26 |
| 5,764,291 A | * | 6/1998 | Fullam | .......... 396/50 |
| 5,900,909 A | * | 5/1999 | Parulski et al. | .......... 382/296 |
| 6,104,307 A | * | 8/2000 | Hanratty | .......... 340/689 |
| 6,148,149 A | * | 11/2000 | Kagle | .......... 396/50 |
| 2001/0007469 A1 | * | 7/2001 | Fuchimukai et al. | .......... 348/208 |
| 2004/0075571 A1 | * | 4/2004 | Fong | .......... 340/689 |

FOREIGN PATENT DOCUMENTS

| | | | | | |
|---|---|---|---|---|---|
| JP | 06068756 A | * | 3/1994 | .......... | H01H/35/02 |
| JP | 07190761 A | * | 7/1995 | .......... | G01C/9/10 |
| JP | 08114830 A | * | 5/1996 | .......... | G03B/7/28 |
| JP | 11162306 A | * | 6/1999 | .......... | H01H/35/02 |

* cited by examiner

Primary Examiner—Wendy R. Garber
Assistant Examiner—John M Villecco
(74) Attorney, Agent, or Firm—Ladas & Parry LLP

(57) ABSTRACT

The invention provides a digital camera with a disposition device for automatically converting a picture to an appropriate image meeting the vision via the viewfinder, wherein the disposition device for auto-detecting the holding condition of a digital camera comprises: an insulating envelope having a cavity which is formed by an insulating bottom and side wall, wherein the cavity is divided into a plurality of concave regions; a conductive plate covering the cavity of the insulating envelope and connected to the power source; a plurality of conductive pads selectively located on the insulating bottom; and a conductive ball rolling in the cavity by the influence of gravity, wherein the movable sensor touching one of the conductive pads and the conductive plate represents the holding condition of the digital camera.

11 Claims, 4 Drawing Sheets

DISPOSITION DEVICE FOR AUTO-DETECTING THE HOLDING CONDITION OF A DIGITAL CAMERA

BACKGROUND OF THE INVENTION

1. Field of the Invention

The invention relates to a disposition device for auto-detecting the holding condition of a digital camera. In particular, the invention relates to a disposition device, which automatically detects a digital camera whether it is held upright or horizontally.

2. Description of the Related Art

The charge-coupled device (CCD) or a complementary metal oxide semiconductor (CMOS) existing in the conventional video camera is introduced into the digital camera and shoots a picture of a subject, wherein the picture is stored in memory in order to show on the display later. As shown in FIG. 1a, the digital camera is held upright to shoot a full-length picture of a subject. As shown in FIG. 1b, after shooting a picture of the subject, photographer commonly rotates the digital camera to a horizontal condition, and the picture displayed on the liquid crystal display of the digital camera is parallel to the ground. If user wants to view a picture meeting the vision via the viewfinder, the user can only rotate the digital camera to the upright condition or utilize built-in software to convert the picture into an upright image. However, whether the digital camera is rotated by a user or by converting the image by utilizing the built-in software, it is inconvenient.

SUMMARY OF THE INVENTION

An object of this invention is to solve the above-mentioned problems of the prior art by providing a disposition device for auto-detecting the holding condition of a digital camera. Firstly, when a digital camera shoots a picture of a subject, the disposition device detects the holding condition of the digital camera, such as an upright condition or a horizontal condition. Then, the disposition device sends a signal to the digital camera circuit. According to the signal, the digital camera circuit automatically executes the built-in software to convert the picture into an appropriate image meeting the vision via the viewfinder.

A second object of this invention is to provide a digital camera with a disposition device for automatically converting a picture to an appropriate image meeting the vision via the viewfinder, wherein the disposition device can send out an electronic signal representing the holding condition of the digital camera when shooting a picture of a subject. Therefore, while displaying the images by a display, a user can view an image meeting the appropriate vision via the viewfinder at that time.

The invention provides a disposition device for auto-detecting the holding condition of a digital camera, comprising: an insulating envelope having a cavity which is formed by an insulating bottom and side wall, a conductive plate for covering the cavity of the insulating envelope, a plurality of conductive pads selectively located on the insulated bottom, and a movable sensor moving in the cavity according to the influence of gravity, wherein the movable sensor touching one of the conductive pads and the conductive plate represents the holding condition of the digital camera.

BRIEF DESCRIPTION OF THE DRAWINGS

This and other objects and features of the invention will become clear from the following description, taken in conjunction with the preferred embodiments with reference to the drawings, in which.

DESCRIPTION OF THE EMBODIMENT

Figure 1A:
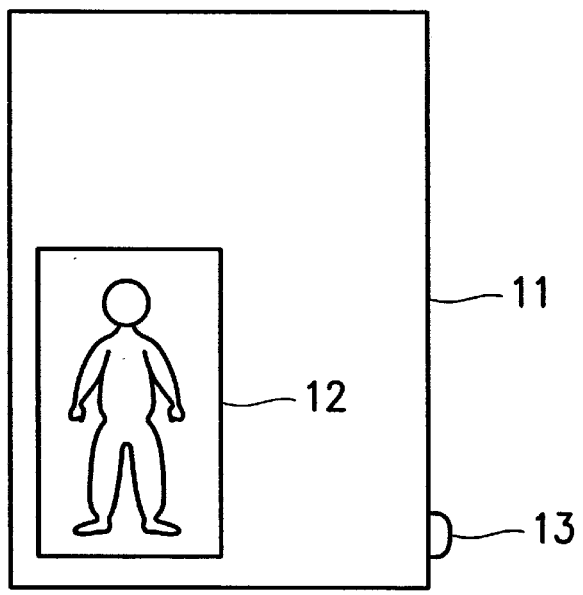
FIG. 1a schematically shows a conventional digital camera shooting a picture of a subject in an upright condition.
Figure 1B:
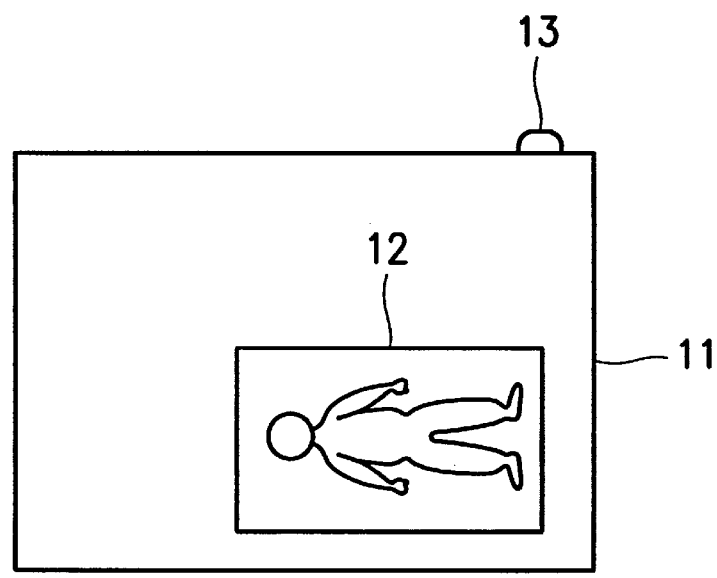
FIG. 1b schematically shows the display direction of a picture, which is taken in the upright position by a conventional digital camera.
Figure 2A:
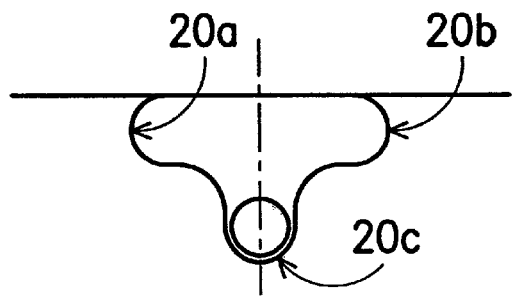
FIG. 2a is a schematic cross-sectional view of a disposition device of the invention.
Figure 2B:
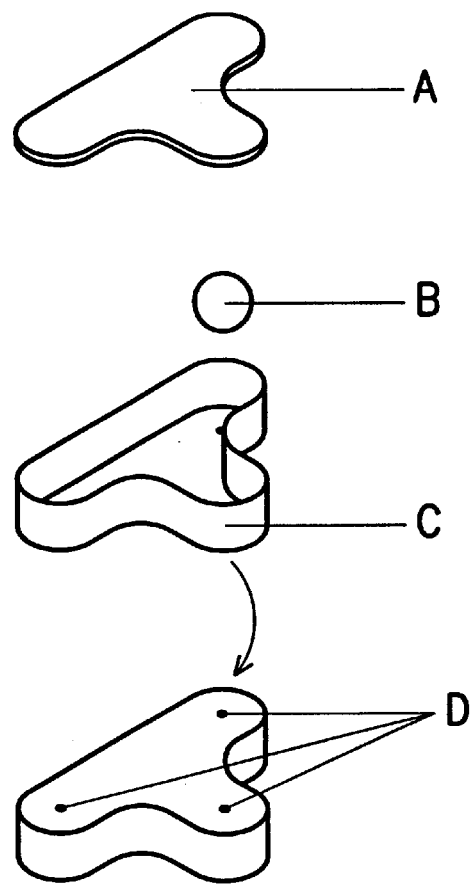
FIG. 2b is an exploded diagram showing a disposition device of the invention.
Figure 4:
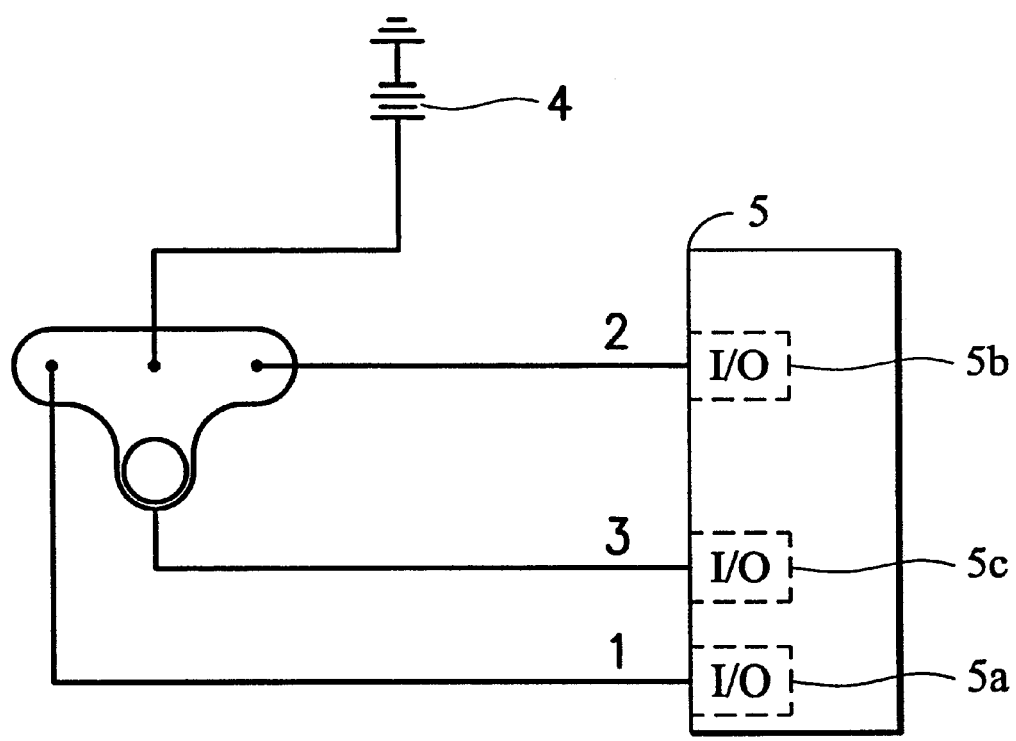
FIG. 4 schematically shows a digital camera circuit of the invention.

FIGS. 2a and 2b respectively show a cross-sectional view and an exploded view of a disposition device of the invention. Referring to FIG. 2b, the disposition device comprises: a conductive plate A, a movable sensor B, such as a conductive ball, an insulating envelope C, and a plurality of conductive pads D. As shown in FIG. 2a, the disposition device is a triangular structure, and has three concave regions 20a, 20b, and 20c for positioning the conductive ball B therein. Two of the concave regions 20a and 20b are symmetrically located at two corners of the disposition device. As shown in FIG. 4, the conductive plate A connects with a power source 4, so that the disposition device can send an electronic signal to a digital camera circuit. In FIG. 2b, the insulating envelope C has a cavity which is formed by an insulating bottom and side wall, wherein the cavity is divided into three concave regions. Three conductive pads D are respectively located on the bottom surface. The movable sensor B, such as a conductive ball B, rolls in the cavity of the insulating envelope C. The conductive ball B would be selectively located in one of the concave regions by the influence of gravity. As the conductive ball B is located in one of the concave regions, one of the conductive pads locating on the insulating bottom touches the conductive ball B. Therefore, a current supplied from the power source will pass through the conductive plate A, the conductive ball B, and the conductive pad D touching the conductive ball B, and then the current as a signal sends out and represents the holding condition of the digital camera.

Figure 3A:
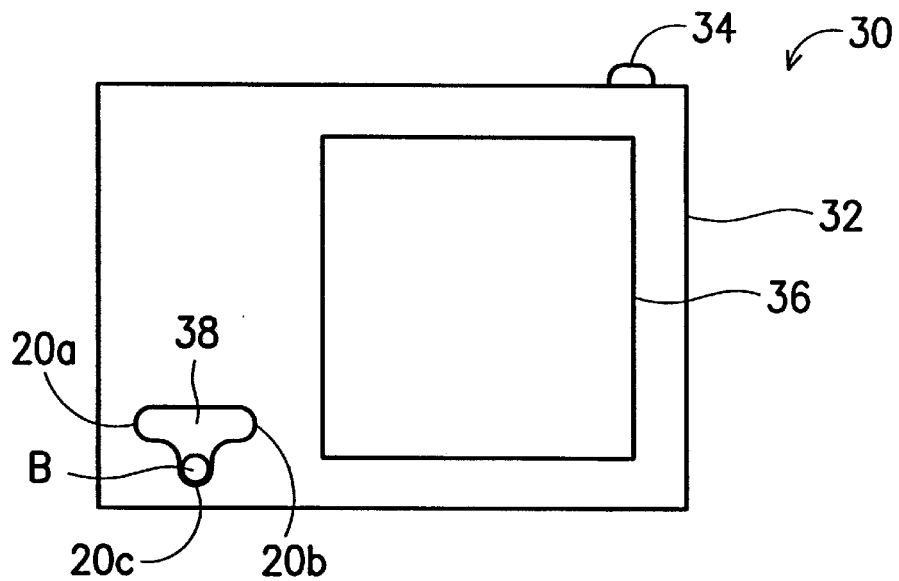
FIGS. 3a to 3c respectively show a digital camera capturing an image of an object in different conditions.
Figure 3B:
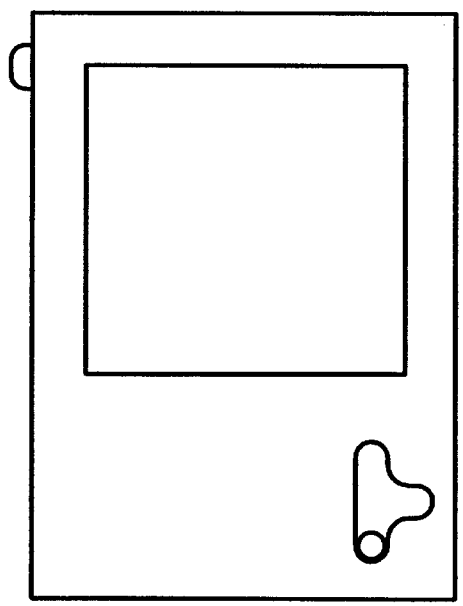
Figure 3C:
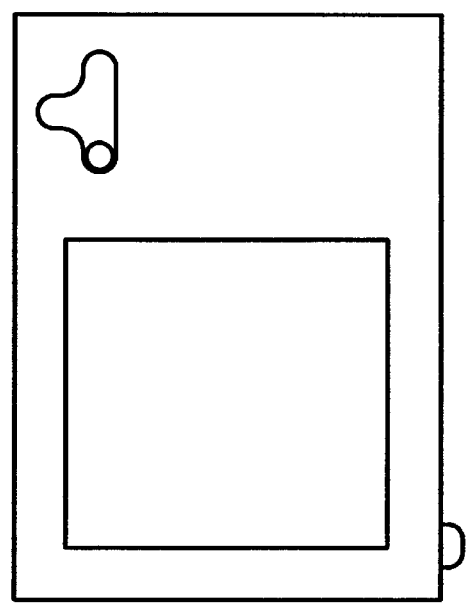

FIGS. 3a to 3c respectively show a digital camera shooting a picture of a subject in different holding conditions. As shown in FIGS. 3a to 3c, a digital camera 30 of the invention comprises a housing 32, a button 34, a liquid crystal display 36 and a disposition device 38. The disposition device 38 of the invention can be installed at any location inside the digital camera. As shown in FIG. 3a, while the digital camera 30 is set along the horizontal direction, the conductive ball B is located at the concave region 20c. As shown in FIGS. 3a and 3b, while the digital camera 30 is moved from the horizontal position to an upright position by counterclockwise rotation, the conductive ball B is rolled from the concave region 20c to another concave region 20a by the influence of gravity. As shown in FIG. 4, when the digital camera shoots a picture of a subject, the power source 4 provides the disposition device 38 with a current as a signal that is conducted to a corresponding I/O port 5a on the digital camera circuit 5 by the loop 1. Therefore, the digital camera circuit 5 receiving the electronic signal through the loop 1 represents that the digital camera 30 is rotated 90 degrees counterclockwise and held upright. FIGS. 3a and 3c show another condition of the digital camera 30 which is also moved from the horizontal position to an upright position, and the conductive ball B is located at the concave region 20b. As shown in FIG. 4, when the digital camera shoots a picture of a subject, the power source 4 also provides the disposition device 38 with a current as a signal that is conducted to a corresponding I/O port 5b on the digital camera circuit 5 by the loop 2. Therefore, the digital camera circuit 5 receiving the electronic signal through the loop 2 represents that the digital camera 30 is rotated 90 degrees clockwise and held upright.

Therefore, the disposition device automatically provides every picture with a notation that depicts whether the digital camera is held in the upright direction or the horizontal direction. According to the notations, the digital camera circuit automatically executes the built-in software to convert the pictures into images meeting the visions via the viewfinder without user's operation. Therefore, the display, for example a LCD on the digital camera, a desktop monitor, a television, can show the images meeting the visions via the viewfinder.

While the preferred embodiment of the present invention has been described, it is to be understood that modifications will be apparent to those skilled in the art without departing from the spirit of the invention. The scope of the invention, therefore, is to be determined solely by the following claims.

What is claimed is:

1. A disposition device for auto-detecting the holding condition of a digital camera comprising:
    an insulating envelope having a cavity which is formed by an insulating bottom and side wall;
    a conductive plate for covering the cavity of the insulating envelope;
    a plurality of conductive pads selectively located on the insulating bottom; and
    a movable sensor moving in the cavity by the influence of gravity,
    wherein the movable sensor touching one of the conductive pads and the conductive plate represents the holding condition of the digital camera.

2. A disposition device for auto-detecting the holding condition of a digital camera as claimed in claim 1, wherein the cavity of the insulating envelope is divided into a plurality of concave regions.

3. A disposition device for auto-detecting the holding condition of a digital camera as claimed in claim 2, wherein every concave region corresponds to one conductive pad.

4. A disposition device for auto-detecting the holding condition of a digital camera as claimed in claim 2, wherein two of the concave regions are symmetrically located.

5. A disposition device for auto-detecting the holding condition of a digital camera as claimed in claim 1, wherein the movable sensor is a conductive ball.

6. A digital camera with a disposition device for automatically converting a picture to an appropriate image meeting the vision via the viewfinder, including a housing, a button, a liquid crystal display, a power source and a digital camera circuit, wherein the disposition device for auto-detecting the holding condition of a digital camera comprises:
    an insulating envelope having a cavity which is formed by an insulating bottom and side wall, wherein the cavity is divided into a plurality of concave regions;
    a conductive plate covering the cavity of the insulating envelope and connecting with the power source;
    a plurality of conductive pads selectively located on the insulating bottom; and
    a conductive ball rolling in the cavity by the influence of gravity,
    wherein the movable sensor touching one of the conductive pads and the conductive plate represents the holding condition of the digital camera.

7. A digital camera with a disposition device as claimed in claim 6, wherein as the conductive ball is located at one of the concave regions, the conductive ball touches both the conductive plate and the corresponding conductive pad.

8. A digital camera with a disposition device as claimed in claim 7, wherein as the button is pressed, a signal representing the holding condition of the digital camera is generated.

9. A digital camera with a disposition device as claimed in claim 8, wherein the digital camera circuit automatically executes built-in software to convert the pictures into images meeting the visions via the viewfinder according to the signal.

10. A digital camera with a disposition device as claimed in claim 6, wherein two of the concave regions are symmetrically located.

11. A digital camera with a disposition device as claimed in claim 6, wherein the conductive pads respectively connect to a corresponding I/O port on the digital camera circuit.

* * * * *